Patented Nov. 24, 1953

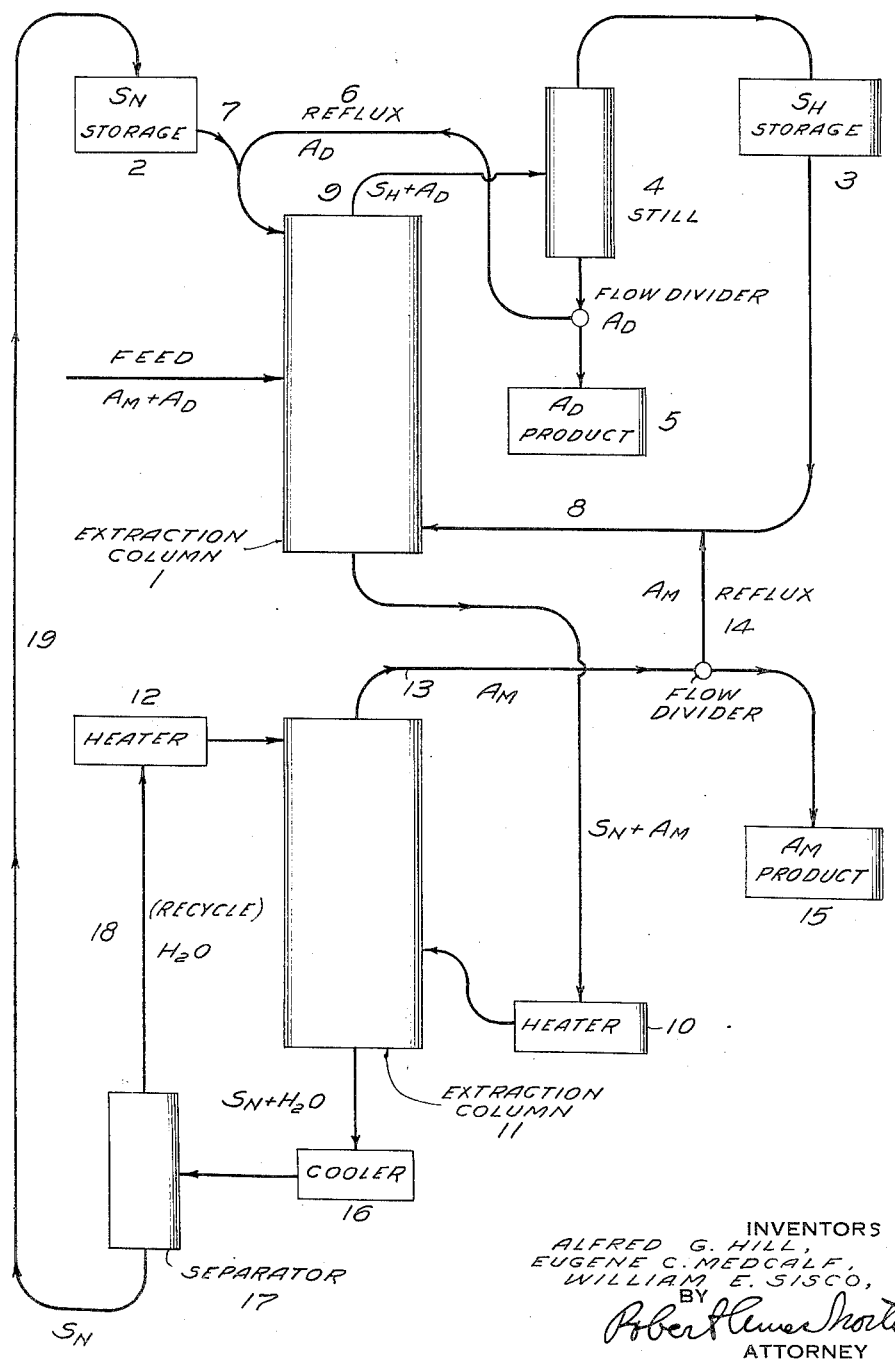

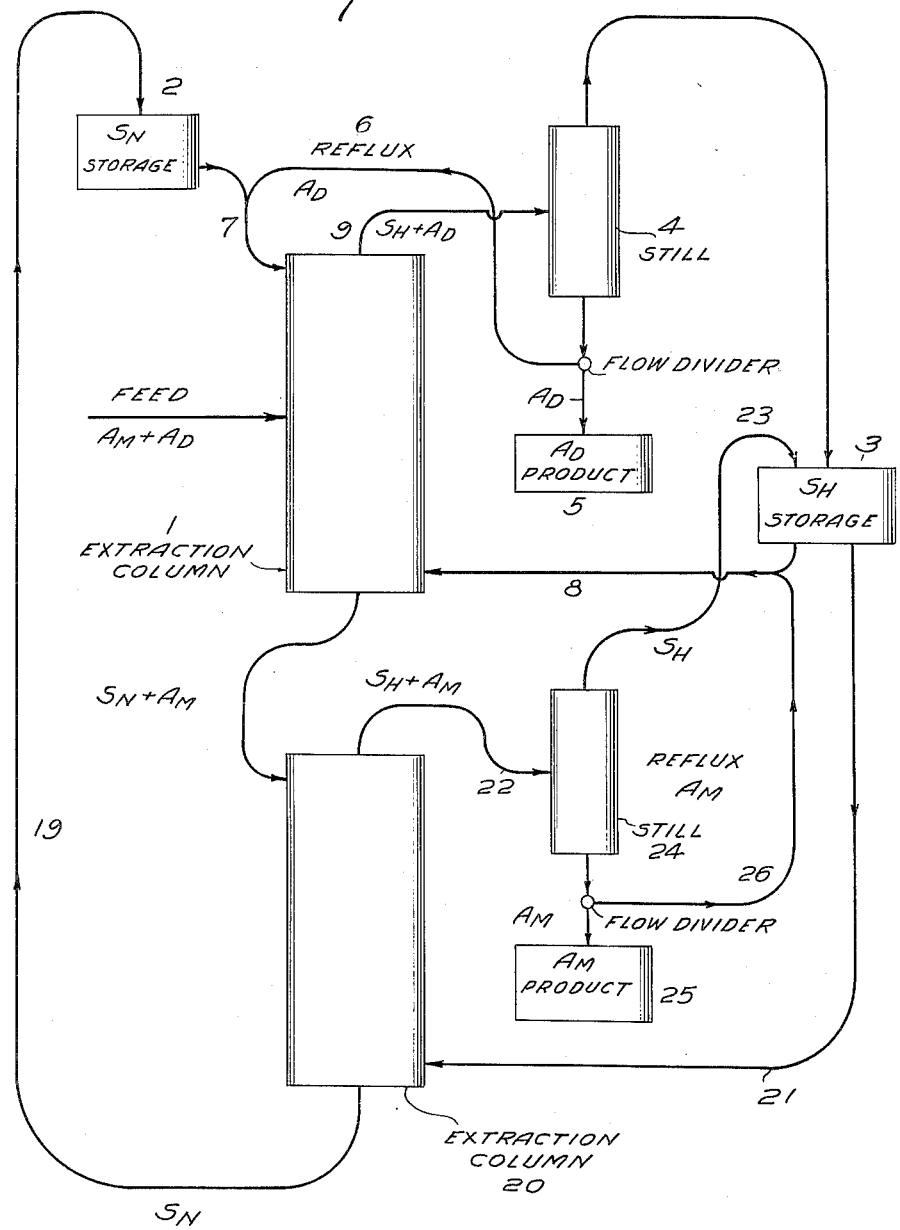

2,660,581

UNITED STATES PATENT OFFICE 2,660,581

SEPARATION OF AROMATIC AMINES

Alfred G. Hill, Martinsville, Eugene C. Medcalf, Bound Brook, and William E. Sisco, Somerville, N. J., assignors to American Cyanamid Company, New York, N. Y., a corporation of Maine Application April 6, 1950, Serial No. 154,364

18 Claims. (Cl. 260—283)

This invention relates to the separation of aromatic amines having different carbon to hydrogen ratios by fractional extraction.

Various substituted aromatic amines are produced by processes which result in mixtures difficult to separate. For example, when aromatic carbocyclic amines are alkylated it is practically impossible to produce a pure N-monoalkyl aromatic amine; it is always mixed with N,N-dialkyl aromatic amine and sometimes with a position isomer in which part of alkyl groups attach themselves to ring carbon atoms. The close boiling points of these mixtures often preclude simple separation by fractional distillation and in the past it has been necessary to use chemical separation methods, for example treatment with an acid anhydride and the like. These chemical separation methods are relatively costly and contribute greatly to the high cost of many monoalkyl aromatic amines.

Carbocyclic aromatic amines have been referred to above. The process of the present invention, however, is not limited to the separation of such amines where the amino group forms no part of the ring. On the contrary, excellent separations may be obtained between heterocyclic tertiary amines of different carbon to hydrogen ratio belonging to the pyridine, quinoline, isoquinoline, pyrimidine, pyrazine and other heterocyclic compounds.

A new class of solvents containing two nitrile groups has been developed for the separation of unsaturated hydrocarbons such as aromatics from various petroleum fractions. Typical of these solvents are the bis(2-cyanoalkyl) ethers, sulfides and amines. The effectiveness of the separation has depended on the remarkable difference in solubility of aromatic hydrocarbons and saturated paraffin hydrocarbons in the solvents. The latter are almost entirely insoluble in the dinitrile solvents at room temperature. The separation of aromatic hydrocarbons from paraffins by means of dinitrile solvents involves essentially a mechanism in which a soluble compound is extracted by a solvent from another compound which is substantially insoluble in the solvent. The process is analagous to a leaching process with solids. The aromatic amines, for which the present invention is designed, do not show any difference in saturation; that is to say, the number of double bonds remains the same. It is therefore not surprising that the dinitrile solvents can not be used to separate the various amines by a simple leaching process because, in most cases, both amines are quite soluble in the dinitrile solvents. In some cases both amines are miscible substantially in all proportions.

The process of the present invention is one of fractional extraction. We have found that if mixtures of aromatic amines of different carbon to hydrogen ratios are subjected to the action of a mixture of a dinitrile solvent and a saturated hydrocarbon liquid, for example by counter-current extraction in suitable extraction columns, it is possible to effect good separation in spite of the fact that both amines are quite soluble in both solvents. In the presence of the two solvents, the amines having higher carbon to hydrogen ratio concentrate in the dinitrile solvent, and those having a lower carbon to hydrogen ratio, in the saturated hydrocarbon. Satisfactory separations are obtainable with a reasonable extraction cycle and with a reasonable amount of recycling of solvents. Losses are extremely low, as the solvents can be recovered almost quantitatively and for the first time there is available a cheap process for obtaining monoalkyl aromatic amines by direct alkylation in cases where mono- and dialkylamines do not have a sufficiently great difference in boiling points to separate them readily by distillation.

The dinitrile solvent may be represented by the following formula:

in which Alk is a lower alkylene radical and X is selected from the group consisting of oxygen, sulfur, NH and N-lower alkyl. Among the ethers, bis(2-cyanoethyl) ether is the cheapest and the most effective. Other ethers, such as dicyanodimethyl ether, $\alpha,\beta'$-dicyanodiethyl ether, various isomeric dicyanodipropyl ethers, mixed ethers such as cyanoethyl-cyanomethyl ether, and the like, may be used. The cheapest dicyanodialkyl amine is bis(2-cyanoethyl) amine. Other amines may be used, such as bis(cyanomethyl) N-methylamine, $\alpha,\beta'$-dicyanodiethyl amines, bis(cyanomethyl) amine, various dicyano isomeric dipropyl amines and the like. Among the sulfides, bis(2-cyanoethyl) sulfide is the most useful.

As a second solvent, any saturated hydrocarbon liquid can be used, such as n-heptane, dodecane, aliphatic naphthas which are mixtures of paraffins having from six to eight carbon atoms, cycloparaffins such as cyclohexane, methylcyclohexane and the like. The choice of saturated hydrocarbon liquid is largely governed by its boiling point, because in many cases a saturated hydrocarbon may be chosen which boils at a temperature so far removed from the boiling point of the amine, which is extracted, that cheap and simple separation by distillation can be effected. There is, naturally, a certain small difference in relative solubilities of the amines having higher hydrogen to carbon ratio in the different saturated hydrocarbons; however, this solubility difference is usually not so great as to dictate the choice of hydrocarbon to use; the other factors, such as its boiling point, often being decisive.

The unexpected ability to effect sharp separation of mixtures, of amines, both of which are quite soluble in the dinitrile solvents, does not, however, result in a mechanism which fails to follow basic physical laws as applied to fractional separation processes, and, in common with these processes, there is an exponential factor making it ordinarily uneconomic to obtain a complete separation with some amine mixtures and a suitable choice of dinitrile solvent and saturated hydrocarbon. It is possible with modern equipment and satisfactory output to obtain a separation in which each constituent separated contains as little as 2% of the other. In most cases, however, a separation of 95% and 5% are considered adequate. This degree of separation will ordinarily be sufficient to permit use of the amine without further purification. In a few cases where complete separation is required, the products of the process of the present invention may be subjected to further separation by chemical means; in such cases, however, the consumption of chemical which renders chemical separation very expensive or prohibitive, is reduced to such a small fraction that economic production of pure amines becomes feasible. In other words, the present invention in given cases may be used as the only method of purification, whereas in other cases it is associated with different purification methods but greatly reduces the cost.

It is possible to use the present invention in a series of batch separations; however, economic separation on a large scale usually requires a continuous procedure. We therefore prefer to use counter-current extraction columns, though the invention in its broader aspects is not limited thereto. Extraction requirements are usually calculated in terms of theoretical plates, though frequently a plate column is less suitable for extraction than other types of vessels. As in all extraction processes, the degree of separation is a product of two factors, the plate equivalent of the column and the amount of the recycling of the two solvents, which, in analogy to distillation procedures, is ordinarily referred to as "reflux." Commercial operation is always a compromise between equipment cost and output. The more equivalent plates a column has, the more expensive it is, the less is the reflux required, and therefore output per unit of time is increased. It is customary in extraction processes to multiply the theoretical plates by a factor which will give the column size for commercially practical reflux ratios. When this factor is applied, the column is still rated in terms of theoretical plates, which define its actual size. In the present case a factor of two has been used for all of the examples.

The dinitrile solvents, which in the drawings described below are referred to as $S_N$, are ordinarily used as single solvents because usually this is the form in which they are commercially produced. It should be understood, however, that mixtures of dinitrile solvents may also be used. The saturated hydrocarbon solvent, however, which is designated on the drawings as $S_H$, will frequently be used in the form of a mixture because it is usually cheaper to obtain a naphtha fraction than pure n-heptane. It is an advantage of the present invention that pure hydrocarbons are unnecessary and that readily obtainable commercial mixtures may be used.

While the present invention is not primarily concerned with the processes used in recovering the solvents, i. e. separating the dissolved amines therefrom, it is an advantage of the invention that very effective separation processes are available. The saturated hydrocarbon solvent is almost always recovered by distillation, for it is completely stable under ordinary distilling conditions and this cheap method is ordinarily preferred.

The recovery of the dinitrile solvent, on the other hand, presents somewhat more of a problem. Many of these solvents are not stable at distilling temperatures and this is one of the reasons why they have not achieved hitherto extensive commercial use in the separation of aromatics from petroleum fractions. There have been developed, however, very effective processes for the recovery of dinitrile solvents. One of these processes which is useful with practically all of the dinitrile solvents, except bis(2-cyanoethyl) amine, involves the use of water. Most of the dinitrile solvents have extraordinarily steep temperature curves of solubility in water. They can, therefore, be extracted or separated by cooling. The solubility at room temperature, except in the case of the bis(2-cyanoethyl)-amine referred to above, is so low that a sharp separtion results. The small amount of dinitrile in the water layer is not lost since the water can be reused, and the small amount of water in the dinitrile solvent does not adversely affect its action in the main fractional extraction process of the present invention. The recovery by means of water is not claimed here but constitutes the subject matter of the copending applications of Medcalf and Sisco, Serial Nos. 143,585 now Patent No. 2,568,159 and 143,586 now Patent No. 2,568,160, both filed February 10, 1950.

Another method of recovering dinitrile solvents which is applicable to all of them is by extraction with a solvent, such as a saturated hydrocarbon, which removes the dissolved amine without dissolving significant amounts of the dinitrile solvent. Any slight amounts dissolved are of no significance because the hydrocarbon solvent is reused in the main process. This separatory process is described and claimed in the copending application of Vriens, Sisco and Medcalf, Serial No. 143,584, filed February 10, 1950 now Patent No. 2,568,176.

The invention will be described in greater detail in the following specific examples and in the drawings, in which:

Fig. 1 is a diagrammatic representation of a process using water for dinitrile solvent separation, and Fig. 2 is a diagrammatic representation of a process using a hydrocarbon extraction method of recovering dinitrile solvents.

*Example 1*

This example relates to the separation of a mixture of N-monomethylaniline and N,N-dimethylaniline, by the method shown in Fig. 1. The mixture of amines, labelled $A_M$ and $A_D$ respectively, is fed into an extraction column 1 of approximately six theoretical plates. Bis(2-cyanoethyl) ether, labelled $S_N$, is introduced into the top of the column through pipe 7 from the storage tank 2 at a rate about five times the rate of amine mixture feed. At the same time a saturated hydrocarbon, n-heptane, labelled $S_H$, is introduced into the bottom of the column through pipe 8 from its storage tank 3 at a rate approximately equal to that of $S_N$. As the heptane is lighter than the bis(2-cyanoethyl) ether, it rises, and the latter sinks, and during the countercurrent flow the two methylanilines distribute themselves between the two solvents, the $S_N$ preferentially dissolving $A_M$ and the heptane $S_H$ preferentially dissolving $A_D$. This solution in $S_H$ leaves the top of the column and flows into still 4 through pipe 9 where $S_H$ is distilled off, returning to the storage tank 3. A stream of the dialkyl aniline $A_D$ flows out of the bottom of the still into a product storage tank 5. A portion of this product is refluxed into the top of the column 1 through pipes 6 and 7.

A relatively rich solution of $A_M$ in $S_N$ flows out of the bottom of column 1 into heater 10 where it is heated to about 80° C. and introduced into a solvent recovery extraction column 11. Water, pre-heated to approximately the same temperature in heater 12, is introduced into the top of the column and flows down. The water extracts $S_N$, and $A_M$ flows out from the top of the column through pipe 13. A portion of this stream is refluxed into the extraction column 1, through pipes 14 and 8, the remainder going to product storage tank 15. A mixture of water and $S_N$ flows out of the bottom of column 11 into a cooler 16 and, after cooling, into a separator 17 where it separates into an upper water layer and a lower solvent layer. The former flows through pipe 18 to heater 12, and the latter through pipe 19 into storage tank 2.

The flowsheet of Fig. 1 represents conditions after equilibrium has been established. The amount of reflux of $A_D$ and $A_M$ is regulated so that the $A_D$ going to tank 5 contains 5 mol percent of $A_M$, and the $A_M$ going to tank 15 about 5 mol percent $A_D$.

There is substantially no loss of $S_H$, and $S_N$ losses in the tank 15 are very small. Usually it will not be necessary to wash this product with a little hot water, although this can be done where the recovered $S_N$ is worth the cost. The separation in separator 17 is not 100%, there being a little $S_N$ in the water and a little water in the $S_N$. The former is not lost as it is recirculated through the extraction column 11, and the latter is too small to interfere with the solvent characteristics of $S_N$ in extraction column 1 to any serious extent (not more than one or two theoretical plate equivalents). If desired, however, the water can be removed by vacuum evaporation. In practical operation with the amine mixture of this example, the removal of the water can hardly be justified.

Fig. 1 is a diagrammatic flowsheet and for clearness the heating and cooling functions have been physically separated; that is to say, separate heaters 10 and 12 and a separate cooler 16 are shown. In an actual plant, heating and cooling operations are effected in heat exchangers to save fuel costs. The drawing, therefore, should be considered as a purely diagrammatic process flowsheet.

*Example 2*

In this example a mixture of N-monoethyl-o-toluidine and N,N-diethyl-o-toluidine is separated using bis(2-cyanoethyl) amine as $S_N$ and, as $S_H$, VMP naphtha, a petroleum fraction containing paraffins having from seven to nine carbon atoms, and having a solvent characteristic substantially the same as n-heptane. The separation procedure follows the flowsheet of Fig. 2, as the water method of recovering $S_N$ can not be used with bis(2-cyanoethyl) amine because the latter is too soluble in cold water. In Fig. 2 the extraction column 1 and its associated equipment is identical with that of Fig. 1 except that column 1 is of four theoretical plates, and the same parts bear the same reference numerals, the mono- and di-ethyl amines being referred to as $A_M$ and $A_D$ as in the first example. The operation of the first extraction column proceeds in exactly the same manner as in Fig. 1, and N,N-diethyl toluidine of approximately 95 mol percent is recovered in tank 5.

The mixture of $S_N$ and $A_M$ leaving the bottom of extraction column 1, however, is subjected to a different treatment in order to separate its constituents. The stream is introduced at the top of an extraction column 20, into the bottom of which $S_H$ from tank 3 is introduced through pipe 21. The latter being lighter rises in the column and extracts $A_M$ from $S_N$, the latter containing only traces of $A_M$ leaving the bottom of the extraction column and being returned to storage tank 2 through pipe 19. The solution of $A_M$ and $S_H$ leaves the top of the extraction column and flows through pipe 22 into still 24. $S_H$ is vaporized and, after condensing, flows through pipe 23 back to storage tank 3. The still residue, which is mostly $A_M$, is divided into two streams, one going to the product storage tank 25, and the other being refluxed into extraction column 1 through pipes 26 and 8.

There is no loss of either $S_N$ or $S_H$ except mechanical losses which are extremely small.

*Example 3*

The procedure of either Example 1 or Example 2 is followed with an extraction column 1 of three theoretical plates. $A_M$ is p-ethylaniline, and $A_D$ is N,N-diethylaniline. $S_N$ and $S_H$ are the same as in Example 1. The degree of separation is the same as in Examples 1 and 2; that is to say, each product is obtained in approximately 95 mol percent purity.

*Example 4*

The procedure of Example 1 is followed, using a mixture of aniline as $A_M$ and mesidine as $A_D$. Extraction column 1 corresponds to four to five theoretical plates. The separation is the same as in preceding examples; that is to say, each product is obtained in approximately 95 mol percent purity.

*Example 5*

The flowsheet of Example 2 is followed with N-monoethyl-o-toluidine as $A_M$ and N,N-diethyl-o-toluidine as $A_D$. Extraction column 1 has three to four theoretical plates for the production of 95 mol percent pure products.

*Example 6*

The procedure of Example 2 is followed in the separation of a mixture of amines in which N-monoethyl-α-naphthylamine is $A_M$ and N,N-diethyl-α-naphthylamine is $A_D$. $S_N$ is bis(2-cyanoethyl) ether and $S_H$ is n-heptane. Extraction column I has three theoretical plates for products of 95 mol percent purity.

Example 7

The procedure of Example 2 is followed in the separation of a mixture of amines in which monomethylaniline is $A_M$ and N,N-dimethylaniline is $A_D$. $S_N$ is bis(2-cyanoethyl)ether, and $S_H$ is VMP naphtha. The extraction column I is of eight theoretical plates, and a recovery of the products of 98 mol percent purity is obtained.

Example 8

The procedure of Example 6 is followed using bis(2-cyanoethyl)sulfide as $S_N$ and n-dodecane as $S_H$. The extraction column has four theoretical plates, and the products are obtained in a purity of 95 mol percent.

If desired, solvent recovery may be effected by the process shown in Fig. 1 instead of that of Fig. 2.

Example 9

The procedure of Example 6 is followed using bis(2-cyanoethyl)amine as $S_N$ and methyl cyclohexane as $S_H$. The extraction column has five theoretical plates, and products are obtained of 98 mol percent purity.

Example 10

The procedure of Example 5 is followed using bis(2-cyanoethyl)amine as $S_N$ and VMP naphtha as $S_H$. The extraction column has four theoretical plates, and products are obtained of 95 mol percent purity.

Example 11

The procedure of Example 1 is followed using $\alpha$-$\beta'$-dicyanodiethyl ether as $S_N$ and methyl cyclohexane as $S_H$. The extraction column has seven theoretical plates, and products are obtained having a purity of 95 mol percent.

Example 12

The procedure of Example 8 is followed using bis(2-cyanoethyl)ether as $S_N$ and VMP naphtha as $S_H$. Four theoretical plates are necessary to produce products of 98 mol percent purity.

Example 13

A series of separations of heterocyclic tertiary amines are carried out using bis(2-cyanoethyl)-ether as $S_N$ and n-heptane as $S_H$. The procedure otherwise follows Example 2. In each case the separation was effected to produce products of 95 mol percent purity. The following table gives the separations with the corresponding theoretical plates of the separating column:

| $A_M$ | $A_D$ | Theoretical plates |
|---|---|---|
| Pyridine | $\beta$-picoline [1] | 18 |
| Do | 2,6-lutidine | 8 |
| Quinoline | Quinaldine | 16 |
| Isoquinoline | do | 16 |

[1] The distribution coefficient for $\beta$-picoline is substantially the same as the mixtures of the three isomeric picolines. The same equipment can, therefore, be used to separate a mixture of the picolines from pyridine.

Figs. 1 and 2 show the feed of $A_M$ plus $A_D$ entering the center of the first extraction column. This position corresponds to a feed of equal parts of the two amines. If the feed contains the amines in different proportions, the point of introduction into the extraction column will be different because, for maximum effective utilization of the column, the feed should be introduced at a point where the amines are present in substantially the same proportions as in the feed.

In both Figs. 1 and 2 the extraction column I, and in Fig. 2 also column 20, is shown with $S_N$ entering the top of the column and $S_H$ the bottom. This is dictated by the relative specific gravities of the solvents or, more accurately, the specific gravities of the solutions $A_M$ and $A_D$ in the solvents. In practically every case, the solution in $S_N$ will be heavier and therefore the introduction into the top of the column as shown in the drawings will be followed. In the rare exception where the specific gravities are the reverse, $S_N$ is introduced into the bottom of the column and $S_H$ into the top. Similarly, in the extraction column II, the water is introduced at the top because, in that particular example, a solution of $S_N$ in water has a higher specific gravity than N-monoethyline, $A_M$. With some amines the reverse is true, in which case the connections to the column should be reversed.

It is an advantage of the invention that the ratio of amine feed to solvents is not critical. However, practical considerations require operating with fairly dilute solutions because if the solution is too concentrated, some amines exert a mutual solvent action so that $S_N$ and $S_H$ no longer are substantially mutually insoluble. After reaching the point where the amines exert any substantial mutual solvent action, reduction of the rate of flow of $S_H$ and $S_N$ will rapidly reduce the efficiency of separation and is therefore undesirable. The examples show a good safe practical concentration for most separations. They are, however, not critical, and somewhat higher concentrations do no harm as far as the separating efficiency is concerned. However, operating with very dilute solutions results in a marked lowering of output, and while technically entirely operative, they are undesirable from an economic standpoint.

We claim:

1. A method of separating aromatic amines having different carbon to hydrogen ratios and containing not more than two rings, which comprises contacting a mixture of said aromatic amines with a mixture of immiscible organic solvents for said aromatic amines, one of said immiscible solvents being a dinitrile solvent having the following formula NC—Alk—X—Alk—CN in which Alk is a lower alkylene radical and X is selected from the group consisting of oxygen, sulfur, NH and N-lower alkyl and the other immiscible solvent being a saturated hydrocarbon solvent, until the mixture of aromatic amines is partitioned between the said immiscible solvents, separating the immiscible solvent layers so formed, recovering the aromatic amine having the higher carbon to hydrogen ratio from the separated dinitrile solvent layer and separately recovering the aromatic amine having the lower carbon to hydrogen ratio from the separated hydrocarbon solvent layer.

2. A continuous process according to claim 1 in which the partitioning of the mixture of aromatic amines between the said immiscible solvent is continuously effected in an extraction column by continuously introducing the immiscible dinitrile and hydrocarbon solvents, respectively, at the proper opposite ends of said column to produce a countercurrent flow of the immiscible solvents relative to each other through the extraction column and continuously feeding the mixture of aromatic amines into the extraction column at an intermediate point therein to introduce the said mixture into the countercurrent streams of said immiscible solvent.

3. A process according to claim 2 comprising refluxing a part of the aromatic amine having the higher carbon to hydrogen ratio to the end of the column where the hydrocarbon solvent is introduced, and refluxing a portion of the aromatic amine having the lower carbon to hydrogen ratio to the opposite end of the column.

4. A process according to claim 1 in which the said dinitrile solvent is a dinitrile ether having the formula $$NC-Alk-O-Alk-CN$$

wherein Alk is a lower alkylene radical.

5. A process according to claim 4 in which the said dinitrile ether solvent is bis(2-cyanoethyl)-ether.

6. A process according to claim 1 in which the said dinitrile solvent is a dinitrile sulfide having the formula $$NC-Alk-S-Alk-CN$$

wherein Alk is a lower alkylene radical.

7. A process according to claim 6 in which the said dinitrile sulfide solvent is bis(2-cyanoethyl)-sulfide.

8. A process according to claim 1 in which the said dinitrile solvent is a dinitrile amine having the formula $$NC-Alk-\underset{H}{N}-Alk-CN$$

wherein Alk is a lower alkylene radical.

9. A process according to claim 8 in which the said dinitrile amine solvent is bis(2-cyanoethyl)-amine.

10. A process according to claim 1 in which the said aromatic amine mixture is a mixture of N-mono-lower alkyl and N,N-di-lower alkyl aromatic amies, the former being preferentially extracted by the dinitrile solvent and the latter by the hydrocarbon solvent.

11. A process according to claim 10 in which the said aromatic amine mixture is a mixture of N-monoethyl-aniline and N,N-diethylaniline.

12. A process according to claim 10 in which the said aromatic amine mixture is a mixture of N-ethyl-o-toludine and N,N-diethyl-o-toludine.

13. A process according to claim 10 in which the said dinitrile solvent is bis(2-cyanoethyl)-ether.

14. A process according to claim 1 in which the said aromatic amine mixture is a mixture of N,N-diethylaniline and p-ethylaniline.

15. A process according to claim 1 in which the said aromatic amine mixture is a mixture of nuclear lower alkyl-substituted aromatic amines and nuclear unsubstituted aromatic amines.

16. A process according to claim 1 in which the said aromatic amine mixture is a mixture of pyridine and alkyl pyridines containing lower alkyl groups.

17. A process according to claim 1 in which the said aromatic amine mixture is a mixture of quinoline and alkyl quinolines containing lower alkyl groups.

18. A process according to claim 1 in which the said aromatic amine mixture is a mixture of heterocyclic aromatic amines having at least one nitrogen-containing ring and different carbon to hydrogen ratios and containing not more than two rings.

ALFRED G. HILL
EUGENE C. MEDCALF.
WILLIAM E. SISCO.

References Cited in the file of this patent

UNITED STATES PATENTS

| Number | Name | Date |
|---|---|---|
| 2,439,534 | Wilkes | Apr. 13, 1948 |
| 2,441,827 | McKinnis | May 18, 1948 |